INVENTORS
Roscoe Reed &
Donald P. Shea

June 15, 1965   D. P. SHEA ETAL   3,189,422
PRODUCTION OF MULTI-CAVITY CONTAINERS
Filed Oct. 19, 1960   3 Sheets-Sheet 3

INVENTORS
Roscoe Reed &
Donald P. Shea
BY Irons, Birch, Swindler & McKie
ATTORNEYS United States Patent Office 3,189,422
Patented June 15, 1965

3,189,422
PRODUCTION OF MULTI-CAVITY CONTAINERS
Donald P. Shea, Anne Arundel County, and Roscoe G. Reed, Baltimore County, Md., assignors to Maryland Glass Corporation, Baltimore, Md., a corporation of Maryland
Filed Oct. 19, 1960, Ser. No. 63,640
4 Claims. (Cl. 65—46)

This invention relates generally to the production of multiple cavity glass containers. More specifically, the invention is directed to a method and apparatus for producing glass containers with plural cavities and having a single cap receiving finish including separate access openings, one for each of the cavities within the container.

The term finish has a well recognized meaning in the glass container industry and is used herein in accordance with such meaning. In a glass container having a neck the finish is that portion of the neck which is formed in a particular configuration to determine the type, style or design of closure to be used with the glass container and in most cases the finish of a glass container produced on automatic container manufacturing machinery is that portion which is formed in the neck ring.

In making glass bottles by automatic machinery, there have been a number of problems in producing bottles having a plurality of compartments or cavities within a single bottle. Such multi-cavity containers have been produced by hand blowing techniques for some time. However, such procedures are not only time consuming and expensive in that a skilled glass blower and extremely meticulous care are required in making the product, but also bottles produced by hand blowing techniques even when made by the same glass blower are not of the desired uniformity between successive products. Particularly, where the specific volume of each compartment or cavity in the bottle is important and where uniformity between the volumes of cavities in successively produced bottles is critical, the production of such bottles by hand blowing techniques is unsatisfactory.

In attempting to imitate the hand blowing techniques for the production of multi-cavity glass containers, prior proposals have called for providing a separate finish such as a screw threaded neck for each cavity provided within the glass bottle. Thus, under prior known procedures, dual cavity glass containers having two separate finishes requiring a pair of caps, one to close each finish have been produced. Even with this approach, there has been difficulty encountered in assuring uniformity in the volumes of the container cavities as between successively produced containers.

It is a primary object of the present invention to provide an improved method and apparatus for producing multiple cavity glass containers having a single finish with an access opening for each cavity extending through the finish.

A further object of the invention is to provide a method for producing multi-cavity glass containers wherein the capacity or volume of the corresponding cavities in successively produced containers will be uniformly equal.

It is also an object of the invention to provide an apparatus and method for producing multi-cavity containers wherein a finish having a flat top is produced to facilitate sealing by a single cap the multiple access openings extending through the finish.

Another object of the invention is to provide a method and apparatus for producing multi-cavity containers wherein formation of the partition between adjoining cavities within the container is controlled to assure uniformity of the exterior configuration of the container and of the respective volumes of the cavities within the container.

It is a further object of the instant invention to provide method and apparatus for the production of multiple cavity glass containers wherein a parison having separate blank body portions extending from a single finish portion of the parison is disposed in a blow mold so that the body portions depend from the finish portion to tend to move together under the effect of gravity and fuse along their length into a unitary partition wall with cavities being formed outwardly from said partition wall by introduction of air into the body portions.

Also it is an object to provide a method and apparatus for producing multiple cavity glass containers wherein the formation of the semi-fluid glass parison in relation to the size of the blow mold chamber is such that closing of the blow mold about the parison engages separate body portions of the parison to urge the body portions together to fuse them along their length into a unitary partition wall from which the cavities are expanded outwardly by introduction of air into the body portions.

An additional object of the invention is to provide an apparatus for producing multiple cavity glass containers wherein a blow mold having rib means extending inwardly of the blow mold chamber is provided with such rib means disposed in a plane corresponding to the desired plane of a partition wall between adjacent cavities of the container to be produced so as to guide and control accurate forming of the partition to assure volumetric uniformity of the cavities in successively produced containers.

The above and other objects and novel features of the instant invention will be apparent from the following description taken in connection with the accompanying drawings. It is to be expressly understood, however, that the drawings are for the purpose of illustration only and are not intended to define the limits of the invention, but rather to merely illustrate one embodiment and structure incorporating the features of the instant invention and for performing the method of this invention.

In the drawings wherein like reference characters refer to like parts throughout the several views.

Figure 1:
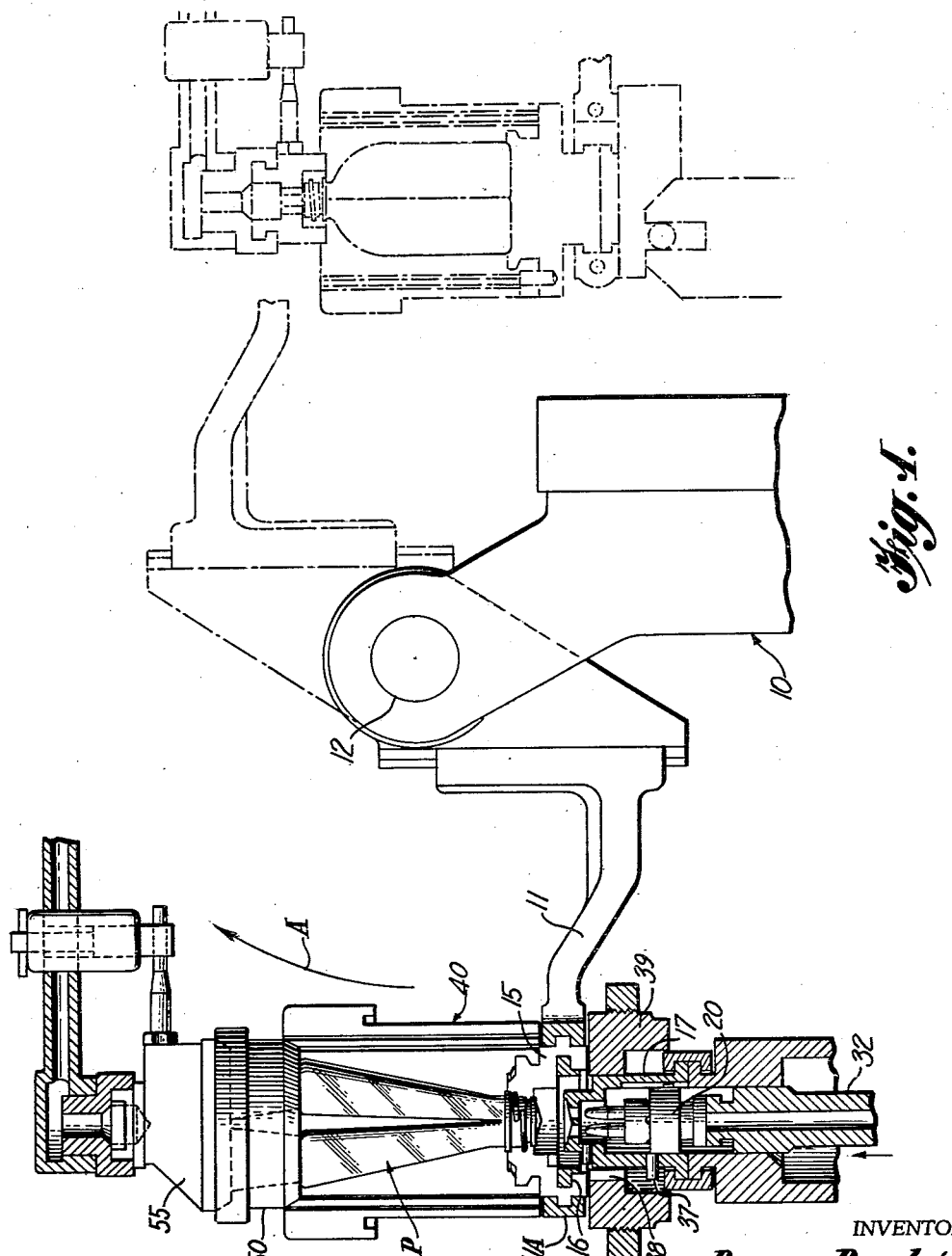
FIGURE 1 is a side elevational view with parts thereof in section illustrating apparatus useable in carrying out the method of the instant invention.

The drawings only illustrate somewhat schematically those portions of the apparatus which take part in the actual formation of the multiple cavity container starting with a pair of gobs of molten glass. The elements or parts shown in the drawings are adapted to be employed with existing bottle manufacturing machinery. Specifically, these parts and elements are useable and are illustrated in the manner that they cooperate with standard "I. S. Machine" as produced by the Hartford Empire Company of Hartford, Connecticut. It is considered unnecessary to enlarge the description and drawing illustrations herein to include a full disclosure of this standard machine since the constructional details of the machine other than as illustrated and described hereinafter form no part of the instant invention.

Referring to FIGURE 1, a portion of the frame 10 of a standard "I. S. Machine" is illustrated with the transfer arm 11 swingably mounted thereon at 12 to be movable through an arc as represented by arrow A. As is conventional in the operation of this machine, the glass parison initially formed from the molten glass in a sectional parison mold is transferred in a semi-fluid state by means of a suitable sectional neck ring carried by arm 11 to position the parison relative to a final blow mold where the parison is expanded by air to the configuration of the chamber formed between the halves of the blow mold.

In FIGURE 1, half of a neck ring 15 is illustrated as it is mounted in collar 11A of transfer arm 11. An annular guide 16 is received within the neck ring 15 to provide an inner guiding bore to slidably receive a thimble 17 in a manner as will be described subsequently.

Figure 2:
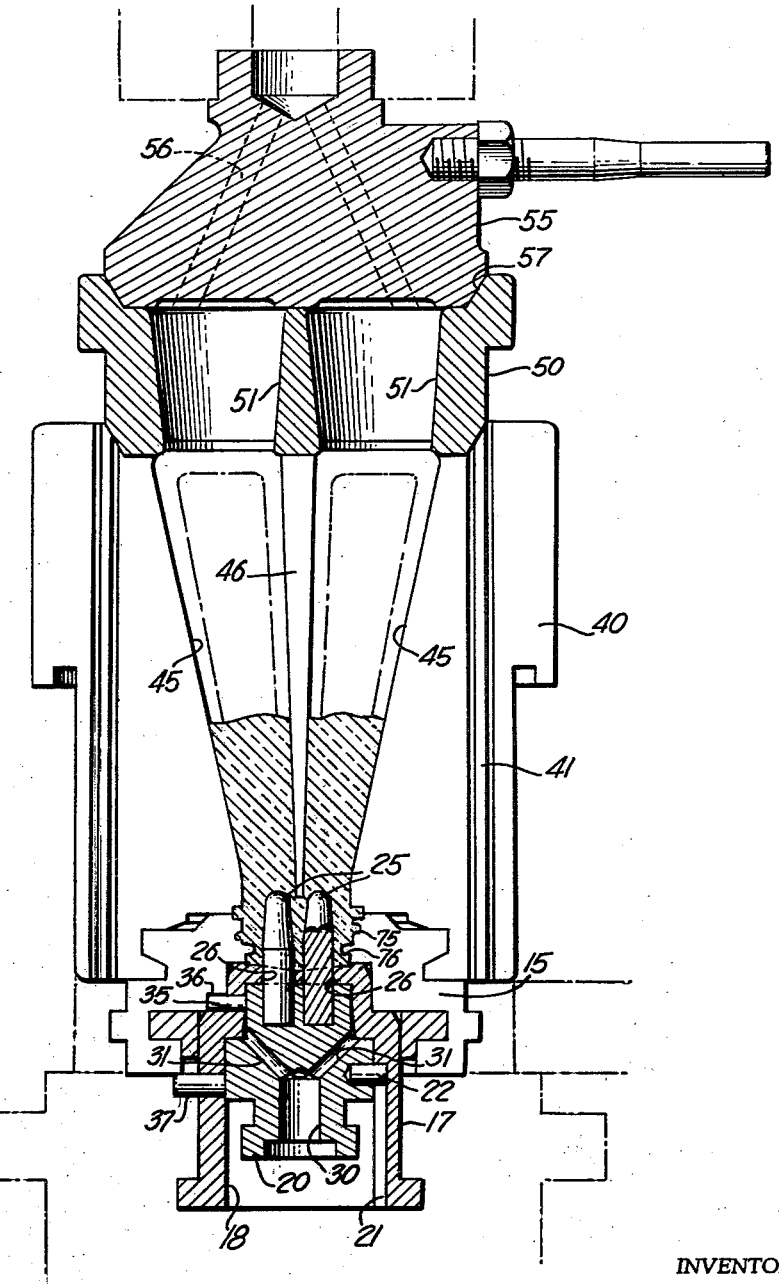
FIGURE 2 is an enlarged sectional view showing a number of parts of FIGURE 1 in a different operational relationship.

The thimble 17, as best shown in FIGURE 2, has an inner bore 18 which slidably receives a plunger 20. Bore 18 has a longitudinal groove 21 in which pin 22 carried by plunger 20 slides such that relative rotation between the thimble and plunger is prevented.

Plunger 20 carries a pair of parallel spaced pins 25 at the upper end thereof which are positioned on the plunger to pass through apertures 26 formed in the top wall of thimble 17. The top wall of thimble 17 is provided with a circular depression which tapers downwardly toward the center thereof as shown in FIGURES 1 and 2 to give the depression a slightly conical cross section. The downward taper of this depression is somewhat exaggerated in the drawings and is relatively flat in actual practice. The provision of this slight taper or conical cross section in the depression is of particular significance in the formation of the multiple cavity container as will be described hereinafter.

The plunger 20 is provided with passageways 30 and 31 as shown in FIGURE 2 to permit flow of air through the plunger when it is retracted within the thimble 17 to the position shown in FIGURE 1 for introducing air in forming the glass parison prior to transfer to the blow mold. The plunger movements are suitably controlled by actuation of member 32 (FIGURE 1).

With further reference to the thimble 17, it will be noted that such thimble has an outwardly projecting guide pin 35 which upon raising of the thimble cooperates with a recess 36 in neck ring 15. Also, a guide pin 37 extends outwardly from thimble 17 to cooperate with a groove 38 formed on the inner wall of holder 39. These guide pins 35 and 37 function by their cooperation with recess 36 and groove 38 to assure against relative rotation between the thimble, neck ring, and holder 39 when the apparatus is operating to form the parison. By maintaining this alignment of the parts, the pins 25 on plunger 20 and apertures 26 on thimble 17 will be properly orientated relative to the neck ring 15 to obtain proper formation of the desired cavities within the parison.

The sections of neck ring 15 cooperate with and are received within an appropriately grooved recess within a sectional blank or parison mold 40, one section of which is shown on FIGURES 1 and 2. This recess in the parison mold sections at the bottom as shown in FIGURES 1 and 2 is formed to grasp and retain the sections of neck ring 15 in the manner as shown in these figures. The mold sections preferably have appropriate ribs 41 and cooperating grooves (not shown) on the mating halves of the parison mold as is conventional in bottle mold forming techniques to assure alignment of the mold sections when they are closed. The blank or parison mold defines between its halves a pair of generally parallel elongated pasages 45 in which separate blank body portions of the semi-fluid glass parison are formed. These passages are separated by a divider member 46 which extends downwardly from the upper end of the mold 40 and tapers in width to terminate immediately above the location of the neck ring 15. With this formation of the blank mold and by its cooperation with the neck ring 15, the parison, as formed therein, is provided with a single finish to which are joined a pair of separate blank body portions extending upwardly from the finish as shown in FIGURE 1.

Cooperating with the parison mold during introduction thereinto of the gobs of molten glass is a funnel 50 having a pair of tapering passages 51. The funnel 50 is seated in a circular recess formed in the top of the parison mold and disposed to guide a pair of gobs of molten glass as they are dropped downwardly into the respective passages 45 within the parison mold.

A baffle 55 having air ducts 56 extending therethrough is provided to rest in an annular seat 57 in the upper end of funnel 50. As will be more fully appreciated by reference to the description given hereinafter, the baffle 55 is positioned over funnel 50 only after the gobs have been discharged into mold 40 through the funnel 50. Baffle 55 provides a means for introducing air on to the top of the gobs of glass to ram the glass down into neck ring 15 and the lower end of mold 40 after which the funnel 50 is removed from between mold 40 and baffle 55 and the baffle seated directly in the recess at the top of mold 40 while the glass blank is blown up into the prescribed configuration for the parison P.

When the parison P has been formed within mold 40 and neck ring 15, the operational steps for such forming being described in more detail hereinafter, the baffle 55 is removed and the sections of mold 40 opened, leaving the separate blank body portions extending upwardly from the finish portion within neck ring 15. Thereupon, the transfer arm 11 is actuated to carry the neck ring 15 and the parison P supported thereby over to the blow mold station. In the apparatus shown, this transfer operation is carried out by swinging movement of arm 11 about pivot 12 in the direction of arrow A to the position as shown in phantom at the right side of FIGURE 1. It is to be understood that within the scope of the appended claims, other transfer means and procedures may be employed if desired.

Figure 3:
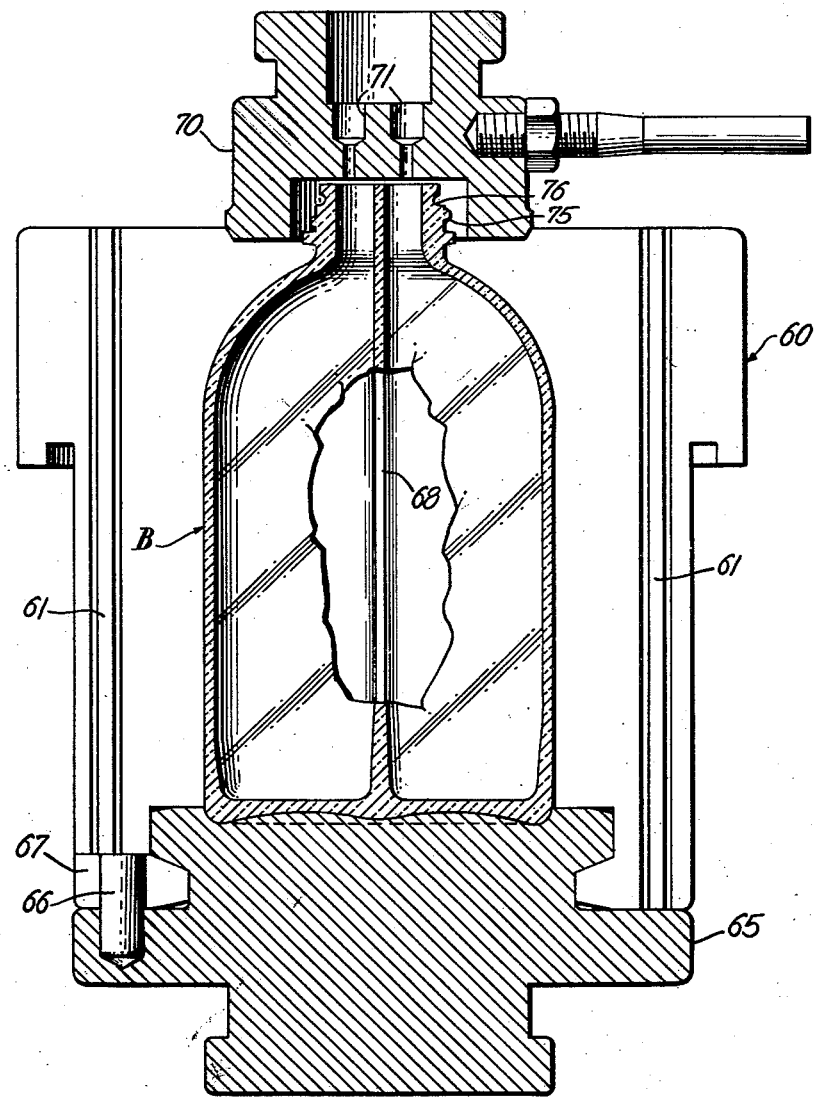
FIGURE 3 is an enlarged sectional view showing further apparatus used in the final blow molding of a multi-cavity container.

At the blow mold station, a sectional blow mold 60, one section of which is shown in FIGURE 3, is provided. The neck ring 15 cooperates with the blow mold so that the sections of blow mold 60 may be closed around the parison which is still in a semi-molten state. Desirably, the chamber within the sections of the blow mold 60 will have a slightly lesser width at the bottom thereof than the maximum spacing of the laterally outer edges of the ends of the body portions of the parison. With such relationship when the sections of mold 60 close, they will engage and tend to urge the separate body portions together thereby promoting fusing of the body portions along their length to effect formation of a unitary partition wall between cavities in the adjacent body portions.

The blow mold 60 is preferably formed with the sections thereof having ribs 61 as shown in FIGURE 3 which cooperate with corresponding grooves (not shown) on the mating half of the mold as are conventionally used to assure mold section alignment upon closing. The lower end of the blow mold is grooved to cooperate with and retain a container bottom forming plate 65. A locating pin 66 is carried by plate 65, such pin being received in a recess 67 formed between the halves of the mold 60 to properly locate and orientate the plate relative to mold 60.

The chamber provided by the sections of mold 60 and by the bottom plate 65 defines the desired exterior configuration of the bottle to be produced in the mold. The opposite halves of the mold 60 are each provided with a longitudinal inwardly projecting rib 68. These ribs extend toward one another and lie in a plane corresponding to the desired plane of the partition wall between cavities in the container being produced. In forming the multi-cavity container, the ribs 68 assist in controlling the position of and accurately forming the partition which separates adjacent cavities and thus function to achieve uniformity in the volumetric capacity of the cavities of the containers successively produced.

After transfer of the parison to the blow mold 60, the neck ring 15 is opened to suspend the parison within the chamber of the mold 60 with the finish projecting upwardly above the mold as shown in FIGURE 3. After removal of the neck ring, a blow head 70 is positioned to cooperate with the mold 60 as shown in FIGURE 3. The blow head 70 has a pair of air passages 71 which terminate above the respective openings in the finish supported by mold 60. Air is introduced through passages 71 to blow the parison with its semi-formed cavities to the contour of the blow mold chamber which as above stated, provides the container with the desired exterior configuration.

It may be noted that in the finish of the container as shown on the drawings there is provided both a screw thread 75 and an annular groove 76. The groove 76 may suitably serve to rotatably retain a cap member provided with an aperture such that the cap may be turned to permit selective discharge of the contents of one or both of the container cavities. Of course, the screw thread may be used with a conventional screw cap. It will, of course, be recognized that the container finish may be formed without the groove 76 and/or the thread 75 where the container is to accommodate different types of closure means.

Having described hereinabove apparatus which may be suitably employed in carrying out the method of the instant invention as such apparatus is illustrated on the drawings, reference may now be made to the overall method steps of the instant invention performed in producing a multi-cavity glass container having a single finish.

With the apparatus elements in their relation as shown in FIGURE 2, wherein the parison mold 40 is closed and with the baffle 55 removed, a gob of molten glass of predetermined quantity is dropped through each of the passages 51 in funnel 50 down to each passage 45 formed within the parison mold 40. Thereafter, the baffle 55 is moved over funnel 50 to rest in seat 57 of funnel 50 and air under pressure applied through ducts 56 to ram the gobs of molten glass down into the parison mold 40 and into the neck ring 15. The glass thus assumes a position as shown in section in FIGURE 2 with the finish portion within neck ring 15 and above the end of thimble 17 precisely formed under the air pressure applied through the ducts 56. The pins 25 will also be surrounded by glass in this forming operation.

After the glass gobs are rammed down into the parison mold and neck ring, the funnel 50 is removed and baffle 55 is lowered to be seated on top of the parison mold 40. It will be noted that the under surface of the baffle 55 is formed to provide the desired contour for the ends of the blank body portions which are subsequently produced in each passage 45 in parison mold 40. It may also be noted that the lower ends of ducts 56 in baffle 55 are disposed so that when the baffle is seated in the recess on the upper end of parison mold 40, these ducts will be blocked by the shoulder of the recess of the parison mold.

Thereafter, the plunger 20 is retracted within thimble 17 and air applied through passageways 30 and 31 to flow upwardly through apertures 26 and into the recesses left by the withdrawal of pins 25. This air pressure is continued to produce semi-formed cavities within the passages 45 in parison mold 40.

The air introduced through the plunger 20 and through thimble apertures 26 will form the blank of glass in a semi-fluid condition into a parison shape as shown in phantom in FIGURE 2 and as shown at P within the parison mold 40 of FIGURE 1. In this state, the parison will have a pair of blank body portions with semi-formed cavities therein with both body portions extending from and being joined with the single finish formed within the neck ring 15. The finish on the parison will have the configuration as shown in FIGURE 2 with the slightly convexly conical outer end and an access opening to each semi-formed cavity extending through the finish and through the outer end thereof.

With the parison P thus formed, the thimble 17 is withdrawn from the neck ring 15 to the position shown in FIGURE 1. The funnel 50 has heretofore been removed and now the baffle 55 is removed from its position on top of the parison mold. The parison P is then transferred by being held within neck ring 15 by swinging the transfer arm 11 through arc A to position the parison relative to the blow mold 60 for the final blow molding operation.

After transfer to the blow mold, the parison is released from the neck ring 15 when the blow mold sections have closed about the parison. As noted heretofore, preferably, the maximum width of the parison at the point furthermost from the finish is slightly greater than the width of the chamber within the blow mold. With this size relationship, the closing of the blow mold sections will engage and tend to urge the body portions of the parison toward one another so that these portions may fuse along their length to form the unitary partition wall which separates the container cavities in the final container product. Thus, as the blow mold sections close, they engage the laterally outer edges of the body portions remote from the finish and push the body portions inwardly for the fusing action.

Also an advantage is obtained in the configuration of the parison herein disclosed in that upon being transferred to the blow mold, the body portions of the parison depend from the single finish and by reason of the distribution of the glass therewithin, they tend to swing together under the effect of gravity thus promoting early forming of the partition wall.

Further, the formation of the chamber within the blow mold 60 to have inwardly extending ribs 68 is an advantage in arcuate forming of the partition wall to control its position which is critical in achieving uniformity in the volumetric capacity of the cavities of containers produced. These ribs 68 extend inwardly and are disposed in a plane which is to include the partition wall of the final container. In the final blown condition, the container thus has grooves or ridges on opposite sides thereof formed by the ribs 68 in the blow mold. This relationship in manufacturing the container promotes control in retaining the proper position and distribution of the glass material which is formed into the partition wall.

After the blow mold sections have closed, the neck ring is opened leaving the parison suspended by the portion of the finish grasped between the blow mold sections. The neck ring is moved back by the transfer arm in readiness to receive and assist in the formation of a second parison to be used in a subsequent blow molding operation.

The blow head 70 is seated over the finish within the blow mold 60 in the manner as shown in FIGURE 3 so that the passages 71 are aligned above the respective openings in the finish leading to the semi-formed cavities in the parison. Blowing air is then introduced to finally shape the parison by expanding the cavities outwardly from the partition wall so that the final container is formed to a condition as shown in phantom in FIGURE 1 and as shown in section in FIGURE 3.

It may be noted that in introducing the final blowing air and also by reason of the slight contraction of the semi-fluid glass as it sets, the slightly conical end of the finish is removed or flattened out so that the final container is provided with an essentially planar end. With such a planar end, a single cap screw onto the finish can be effective in sealingly closing the access openings which enter through the finish. In the absence of providing this excess glass material in the parison by forming the slightly conical upper end of the finish, the end of the finish in the final container might be somewhat concave such that a cap applied thereto would not seal against intermixing of materials which are placed in the separate container cavities.

After the final blow molding operation, the blow head 70 is removed, the sections of blow mold 60 opened and the finished bottle B removed for suitable heat treatment, etc., as may be desired in final finishing of the container.

Although the specific disclosure herein has been of a multiple cavity bottle having two separate cavities, it is to be understood that the invention is also applicable to the production of containers having more than two cavities.

Further, it is contemplated within the scope of the instant invention that the cavities in a particular container need not be of equal volume or capacity as between each other. The significant aspect of the invention is that by the careful control and accurate positioning of the partition disposed between adjacent cavities, the capacity of corresponding cavities in successively produced containers will be uniformly equal. Within any one container, the volumetric relationship between the capacity of the container cavities may assume any desired proportion.

In carrying out the invention, the cavity capacity may be altered by one or a combination of several approaches. The molds may be constructed so that the location of the partition as produced in the container will be off center such that the cavity on one side of the partition is larger in volume than that of the cavity on the opposite side of the partition. Also by reducing the weight or quantity of one of the glass gobs which are introduced into the parison mold, the cavity walls formed from this smaller gob will have, in the final blown product, a slightly thinner cross section resulting in a larger volume for that particular cavity. One other approach to modifying the cavity size is by forming the blow mold such that a larger or smaller space for the formation of one or another of the container cavities is provided between the blow mold sections.

We claim:

1. A method of producing a multiple cavity container having a single finish with a separate access opening to each cavity extending through such finish comprising forcing molten glass into a neck ring and parison mold formed to produce a blank having a single finish with a separate opening therein for each cavity of the container to be produced, said blank further having a separate and independent blank body portion for each of said openings joined solely with and extending from said finish, introducing air through each of said openings to form said blank into a parison having a separate semi-formed cavity within each blank body portion with said portions remaining separate and independent and being joined solely at the single finish, transferring the parison to a blow mold while said body portions are separate and independent, introducing air through each of said openings into said semi-formed cavities to expand said cavities and fuse adjacent blank body portions along their length into a unitary partition wall between adjacent cavities and shape the cavities outwardly from said partition wall to the contour of the blow mold, and guiding from the exterior of the blank body portions the fusing of said adjacent blank body portions to locate said unitary partition wall and thereby achieve a predetermined volumetric relationship between the respective cavities.

2. A method of producing a multiple cavity container having a single finish with a separate access opening to each cavity extending through such finish comprising forcing molten glass into a neck ring and parison mold formed to produce a blank having a single finish with a separate opening therein for each cavity of the container to be produced, said blank further having a separate and independent blank body portion for each of said openings joined solely with and extending from said finish, introducing air through each of said openings to form said blank into a parison having a separate semi-formed cavity within each blank body portion with said portions remaining separate and independent and being joined solely at the single finish, transferring said parison to position said finish with said independent body portions depending from said single finish so that said body portions tend to move together under the effect of gravity to fuse along their length into a unitary partition wall between adjacent cavities, engaging the laterally outer ends of the depending body portions remote from said finish to urge said adjacent body portions together to form said unitary partition wall between adjacent cavities, and introducing air into each of said semi-formed cavities to shape the cavities outwardly from said partition wall to the contour of a blow mold enclosing said parison.

3. Apparatus for producing a multiple cavity container comprising a parison mold and a neck ring mounted to cooperate therewith, said parison mold defining separate and independent passages to form separate blank body portions extending from and joined solely with a single finish formed in said neck ring, means mounted relative to said neck ring to form a plurality of separate openings through said finish each of said openings communicating with a semi-formed cavity in the parison, a blow mold defining a chamber of the configuration desired for the container, said chamber having rib means extending inwardly from opposite sides thereof, said rib means being disposed in a plane corresponding to the plane of a unitary partition wall to be produced between adjacent cavities of the container, means disposed to be operable intermediate said parison mold and said blow mold for transferring a parison formed in said parison mold and neck ring to said blow mold, and means mounted to cooperate with said blow mold for introducing air through said openings to expand said semi-formed cavities to the contour of the blow mold chamber.

4. Apparatus for producing a multiple cavity container comprising a parison mold and a neck mold mounted to cooperate therewith, said parison mold defining separate and independent passages to form separate blank body portions extending from and joined solely with a single finish formed in said neck ring, a thimble cooperable with said neck ring to close the one end of said neck ring and form the outer end of the finish on a parison, said thimble having the neck ring closing end thereof provided with apertures corresponding to the number of cavities to be provided in the container being produced, a plunger having pin means slidable through said apertures to pre-form the openings in the parison finish, means for introducing air through said apertures to create semi-formed cavities in said parison, a blow mold defining a chamber of the configuration desired for the container, said chamber having rib means extending inwardly from opposite sides thereof, said rib means being disposed in a plane corresponding to the plane of a unitary wall partition to be produced between adjacent cavities of the container, means disposed to be operable intermediate said parison mold and said blow mold for transferring a parison in said parison mold and neck ring to said blow mold; and means mounted to cooperate with said blow mold for introducing air through said opening to expand said semi-formed cavities to the contour of the blow mold chamber.

References Cited by the Examiner

UNITED STATES PATENTS

| | | | |
|---|---|---|---|
| 593,857 | 11/97 | Ripley | 65—229 |
| 843,594 | 2/07 | Fletcher | 65—69 |
| 1,843,165 | 2/32 | Kadow et al. | 65—216 |
| 2,065,504 | 12/36 | Beck | 65—79 |
| 2,142,954 | 1/39 | Rowe | 65—76 |
| 2,285,707 | 6/42 | Gardwood et al. | 65—261 X |
| 2,328,873 | 9/43 | Young | 65—233 |
| 2,826,867 | 3/58 | Naval et al. | 65—229 |
| 2,949,701 | 8/60 | Olson et al. | 65—235 |

FOREIGN PATENTS

| | | |
|---|---|---|
| 291,785 | 5/16 | Germany. |
| 640,707 | 1/37 | Germany. |
| 439,525 | 9/48 | Italy. |
| 1,016,202 | 8/52 | France. |

DONALL H. SYLVESTER, *Primary Examiner.*

ARTHUR P. KENT, *Examiner.*